United States Patent [19]

Bernard et al.

[11] Patent Number: 4,564,271

[45] Date of Patent: Jan. 14, 1986

[54] RING RESONATOR AND METHOD OF FORMING

[75] Inventors: Walter Bernard, Meersburg; Klaus Langner, Überlingen, both of Fed. Rep. of Germany

[73] Assignee: Bodenseewerk Geratetechnik GmbH, Bodensee, Fed. Rep. of Germany

[21] Appl. No.: 549,287

[22] Filed: Nov. 7, 1983

[30] Foreign Application Priority Data

Jun. 21, 1983 [DE] Fed. Rep. of Germany ....... 3322212

[51] Int. Cl.$^4$ ............................ G02B 7/18; G02B 5/10
[52] U.S. Cl. .................................. 350/622; 350/320; 350/631
[58] Field of Search ............... 350/320, 618, 622, 623, 350/624, 626, 631, 632; 228/116, 172; 156/153, 306.3; 65/43; 372/94, 107, 108, 99

[56] References Cited

U.S. PATENT DOCUMENTS 3,486,130 12/1969 Macek .................................. 372/94
3,535,040 10/1970 Vigneri et al. ........................ 372/94
4,157,802  6/1979 May .................................... 350/631

FOREIGN PATENT DOCUMENTS 1191483  4/1965 Fed. Rep. of Germany ...... 350/631
1028496  5/1966 United Kingdom .
1052395 12/1966 United Kingdom .
2059143  4/1981 United Kingdom .

OTHER PUBLICATIONS

Science News, "Cold Welding Dangerous", vol. 90, 5, Nov. 1966, p. 371.

Primary Examiner—Jon W. Henry
Attorney, Agent, or Firm—Lee, Smith & Zickert

[57] ABSTRACT

Mirror carriers (14,16,18) with resonator mirrors (30,32,34) are adjusted relative to a base (10) by means of a manipulator and are durably affixed to a surface (12) of the base (10) in their adjusted positions by attachment by optical contact. Several designs of mirror carriers and bases are described. A wet attachment method for initiating the process of attachment by optical contact is described, wherein a drop of an auxiliary liquid (acetone) creeps into the gap between the surfaces of the mirror carrier and the base and then evaporates.

7 Claims, 8 Drawing Figures

RING RESONATOR AND METHOD OF FORMING

The invention relates to a method for adjusting and mounting resonator mirrors in laser comprising the steps of:

(a) providing mutually complementary surfaces on a mirror carrier carrying the resonator mirror and on a base,
(b) joining said mirror carrier and said base with said complementary surfaces being contiguous,
(c) adjusting the orientation of said mirror carrier and of said resonator mirror relative to said base, the two complementary surfaces sliding on each other and being shaped and arranged relative to the resonator mirror such that such a sliding movement causes the orientation of said resonator mirror relative to the basis to be changed, and
(d) permanently affixing the mirror carrier in the adjusted position.

High demands are made on the accuracy of the alignment of resonator mirrors in a laser. Though it is possible to make the resonator mirrors adjustable and to align them accordngly (U.S. Pat. No. 3,428,915), it cannot be avoided in this case that the adjustment is adversely affected by outside influences such as shock, vibrations or temperature variations. Re-adjustment will then become necessary, which is time consuming and, with some applications such as laser gyroscopes, is not possible at all.

Therefore it is known to machine a resonator block for a ring laser with high precision from one integral piece. The resonator block has ground surfaces to which the resonator mirrors are attached by optical contact. The arrangement of the ground surfaces, to which the resonator mirrors are attached by optical contact, has to be so precise, that the ring resonator will at once be in resonance, after the resonator mirrors have been attached, subsequent adjustment is not possible. This is very expensive to manufacture and results in a high percentage of refuse.

A ring resonator having a resonator block and mirrors attached thereto is shown in German patent document No. 30 06 977.

German patent document No. 1,191,483 shows a laser comprising a quartz block which defines a longitudinal passage therethrough serving as resonant cavity. Opposite end faces of the quartz block are exactly mutually parallel and are ground to be plane at right angles to the axes of the longitudinal passage. Quartz blocks serving as mirror carriers and being ground plane are attached by optical contact to these end faces of the first mentioned quartz block. The latter quartz blocks carry reflecting layers which are exactly at right angles to the axis of the longitudinal passage. The aligument of the reflecting layers depends on the accuracy with which the end faces of the quartz block have been ground. Adjustment is not possible, even before the mirror carriers are attached to the quartz block by optical contact, as the planes of the mirrors coincide with the plane contact surfaces of the parts.

U.S. Pat. No. 3,566,302 discloses a method for attaching resonator mirrors in a laser, wherein a mirror carrier has substantially cut-off hemispherical shape and is placed in the concave-spherical surface substantially complementary thereto of a vessel defining the resonant cavity. The resonator mirror is formed on a plane surface of the mirror carrier. Because of the spherical surfaces the mirror carrier and the resonator mirror can be aligned and adjusted relative to the vessel and the resonant cavity. In the adjusted state, when a laser beam is formed, the mirror carrier wil be affixed. To this end the concave-spherical surface is roughened. A hardening sealant is introduced between the complementary spherical surfaces of the mirror carrier and of the vessel. As long as the sealant is still soft, adjustment of the mirror carrier is possible. Affixing is caused by hardening of the sealant.

German patent document No. 24 42 888 discloses a laser resonator wherein an output mirror and a Littrow prism are connected with a glass vessel through glass solder seals. While the glass solder seal is still in its yielding state, the output mirror and the Littrow prism can be aligned.

It is the object of the invention to mount resonator mirrors in a laser with relatively low expenditure, durably and accurately.

According to the invention this object is achieved in that (e) the said surfaces of the mirror carrier and of the base are ground exactly mutually complementary,
(f) the said complementary surfaces of the mirror carrier and of the base are brought into direct contact with each other and
(g) affixing is effected with this direct contact of the ground surfaces.

According to the invention the surfaces are ground to be exactly mutually complementary. They are brought into direct contact with each other, i.e. into contact without any sealant, solder or adhesive being interposed. The parts are affixed with this direct contact. This ensures that the highly accurate alignment is maintained also with temperature variations.

German patent document No. 1 191 483 discloses attachment of the mirror carrier with optical contact, i.e. direct contact of the surfaces. However there is no possibility af adjustment. The surfaces, namely the end faces of the quartz block and the plane surfaces complementary thereto of the mirror carriers are not shaped or arranged relative to the mirrors such that, for example by sliding movement of these surfaces on each other adjustment would be possible prior to the attachment of the mirror carriers by optical contact.

In U.S. Pat. No. 3,566,302 the surfaces are not ground to be exactly mutually complementary. At least one of the surfaces is roughened, and a layer of sealant is provided between the surfaces.

Also German patent document No. 24 42 888 does not disclose two ground surfaces in direct contact with each other, but the surfaces are interconnected by glass solder. Adjustment is possible not because of the geometry of the surfaces but only by deformation of the glass solder.

Modifications of the method of the invention are subject matter of the sub-claims 2 to 5.

Ring resonators wherein the resonator mirrors are mounted to be adjusted and affixed in accordance with the method of the invention are subject matter of the claims 6 to 9.

Embodiments of ring resonators will be described in greater detail hereinbelow with reference to the accompanying drawings.

Figure 1:
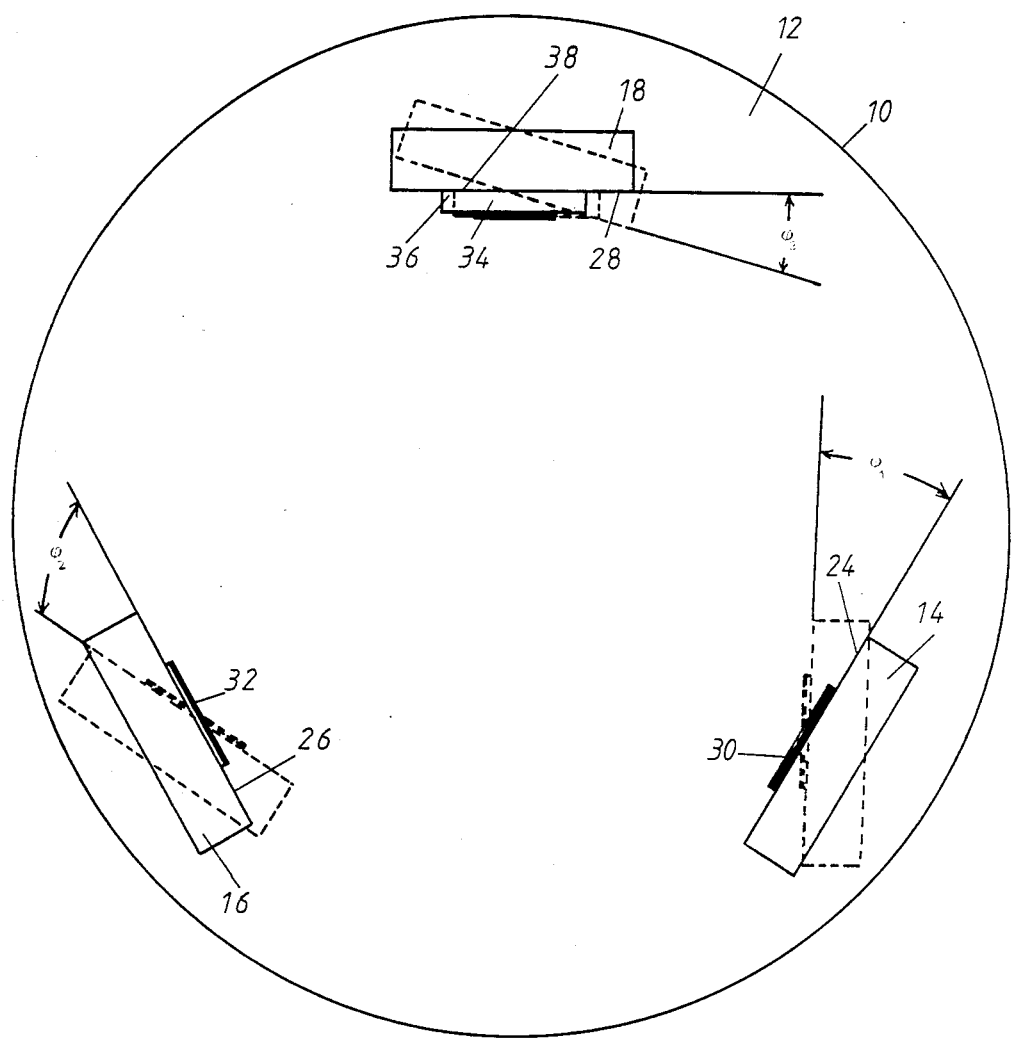
FIG. 1 is a plan view of a resonator mirror arrangement.
Figure 2:
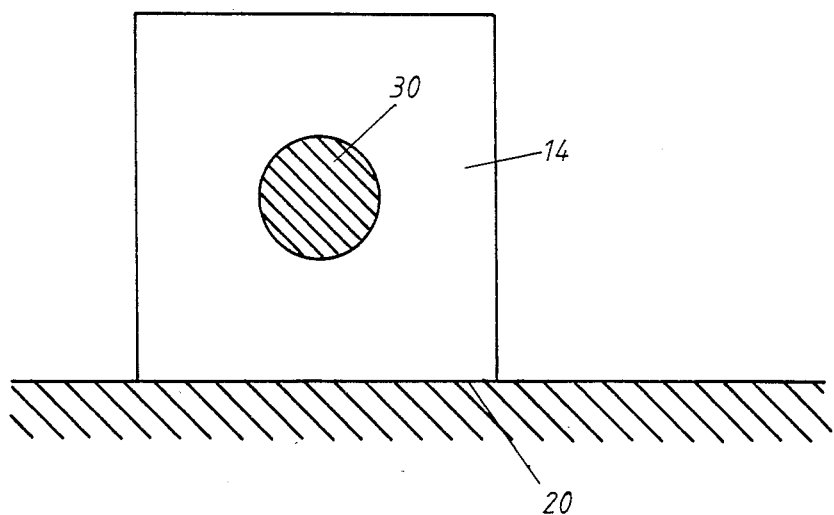
FIG. 2 is a front elevational view of a mirror carrier with a resonator mirror
Figure 4:
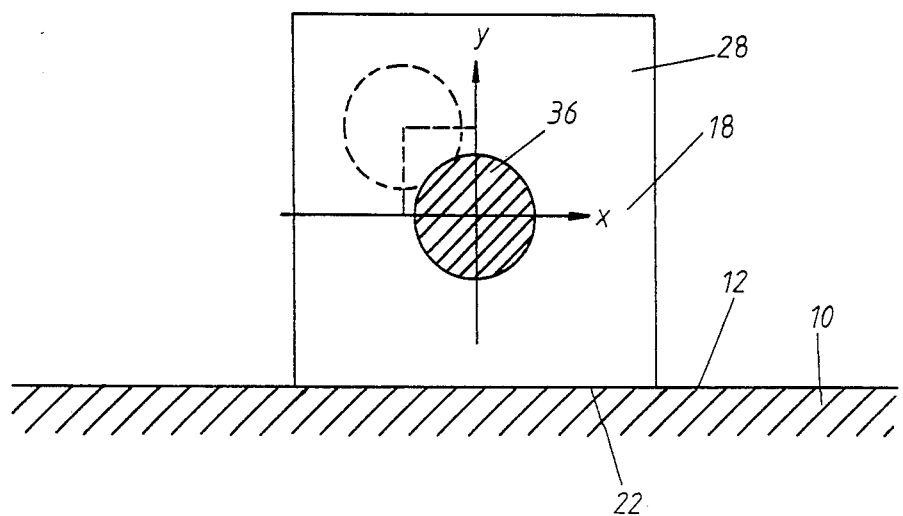
FIG. 4 is a front elevational view of a mirror carrier with a resonator mirror in the form of a concave mirror and illustrates the lateral and elevational adjustment.
Figure 3:
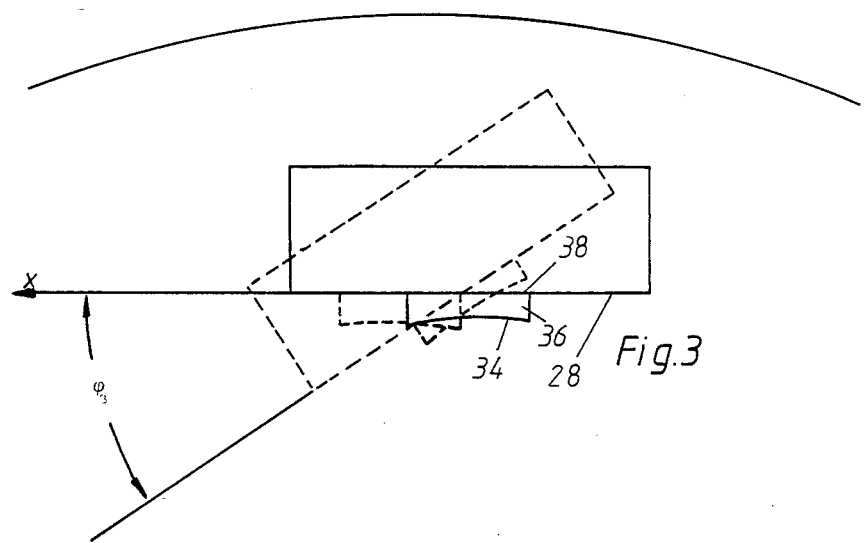
FIG. 3 is a plan view of a mirror carrier with a resonator mirror in the form of a concave mirror and illustrates the angular adjustment.
Figure 5:
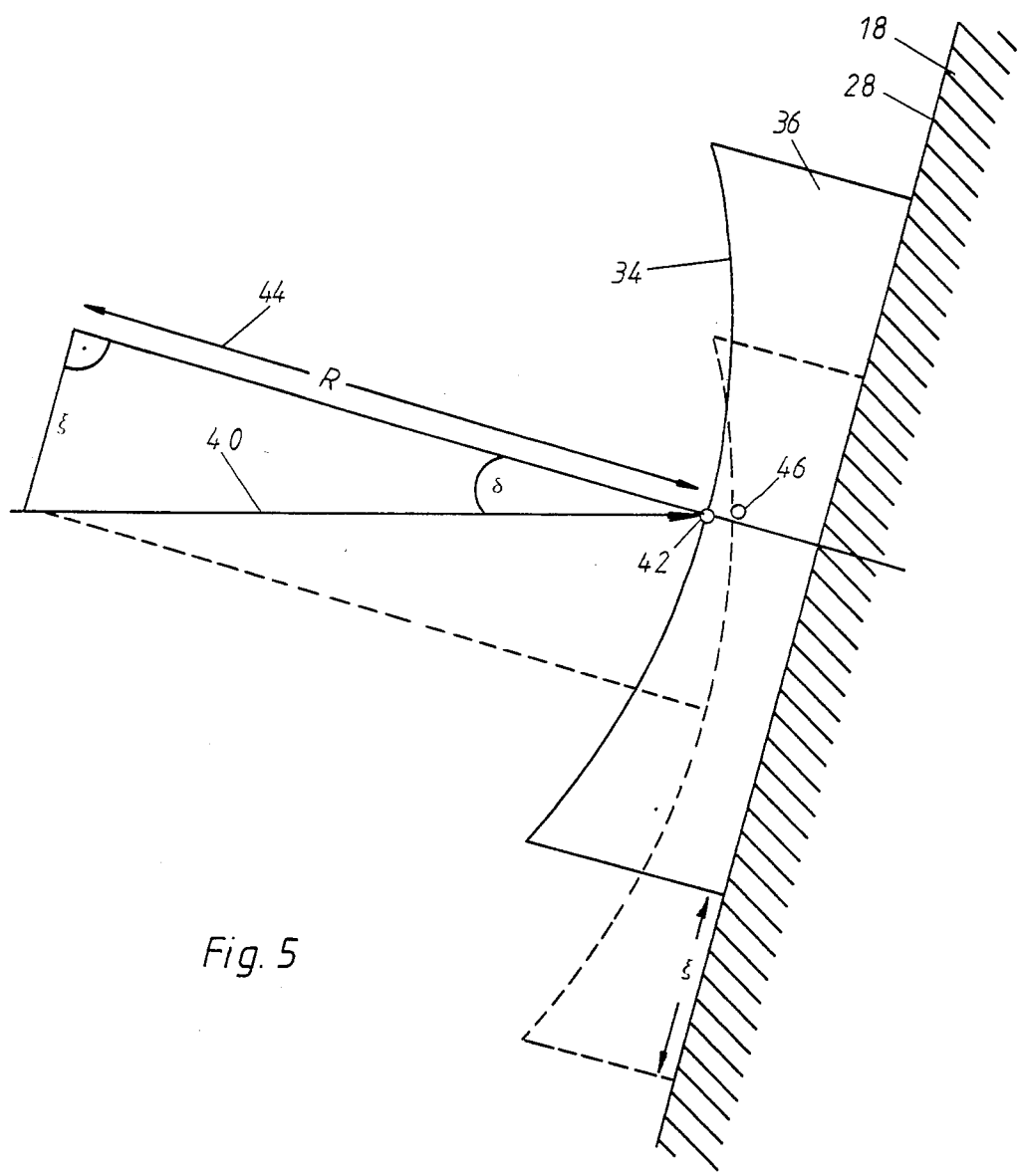
FIG. 5 illustrates the effect of a lateral or elevational adjustment of the concave mirror on the point of incidence of the beam.

Referring to FIG. 1, numeral 10 designates a base having a ground plane surface 12. With the embodiment illustrated three mirror carriers 14,16,18 are mounted on base 10. Each of the mirror carriers 14,16,18 has a ground plane surface 20 or 22, respectively, (FIGS. 2 and 4) in engagement with the ground plane surface 12 of the base 10. The mirror carriers 14,16 and 18 have second ground plane surfaces 24,26 and 28, respectively, which extend at right angles to the respective ground plane surfaces 20 and 22, respectively, engaging the base 10. The resonator mirrors 30,32 and 34 are attached to the respective second ground plane surfaces 24, 26 and 28, respectively. The resonator mirrors 30 and 32 are plane mirrors. The resonator mirror 34 is a concave mirror. The radius of of curvature of this concave mirror is selected in conventional manner depending on the length of the resonator. The plane mirrors 30 and 32 can be a reflecting layer applied directly to the second plane surface 24 or 26 by vacuum metallization. Alternatively, the reflecting layer can, however, be provided on a glass substrate which is attached to the second ground plane surface 24 or 26 by optical contact. The concave mirror 34 is provided on a concave mirror substrate 36 having a ground plane rear surface 38. The ground plane rear surface 38 of the concave mirror substrate 36 engages the second ground plane surface 28 of the mirror carrier 18 and is affixed thereto after having been adjusted in the plane of this surface.

The mirror carriers 14,16,18 have a ground surface, namely the ground plane surface 20 or 22, respectively, placed in contact with an also ground surface, namely the ground plane surface 12 of the base 10. Then the mirror carriers 14,16, 18 with the resonator mirrors 30,32 and 34, respectively, are adjusted relative to the base 10. Preferably this is done by means of appropriate manipulators, which are well known to those skilled in the art and therefore are not described here. The adjustment with the adjustment angles $S_1$, $S_2$ and $S_3$ (exaggerated in the drawing) is illustrated in FIG. 1 by the positions of the mirror carriers 14,16,18 shown in dashed lines. Subsequently the mirror carriers 14,16, and 18 are durably affixed in their adjusted positions. Then the manipulators can be removed.

With the preferred embodiment the mirror carriers 14,16,18 are affixed by attachment by optical contact. Mirror carriers 14,16,18 and base consist of identical materials. In the preferred embodiment the mirror carriers 14,16, and 18 and the base 10 consist of a material, for example "Zerodur", having extremely low thermal dilatability. The ground and polished surfaces 12 and 20 or 22, respectively, are well cleaned. They are able, at first, to slide on each other for adjustment purposes, an air layer between the surfaces 12 and 20 or 22, respectively, acting as gliding film. When the correct adjustment is achieved, the mirror carriers 14,16 and 18 are pressed against the surface 12 of the base 10. Thereby the gliding film of air between the surfaces to be connected is removed. This causes durable connection of the parts 10 and 14,16,18 through molecular forces. This connection is insensitive against mechanical influences such as shocks or vibrations as occurring during normal operational conditions and against the usual temperature variations. It is, however, possible to detach this connection by applying excessive mechanical stress to one of the connected parts. This kind of connection is called "attachment by optical contact".

Figure 7:
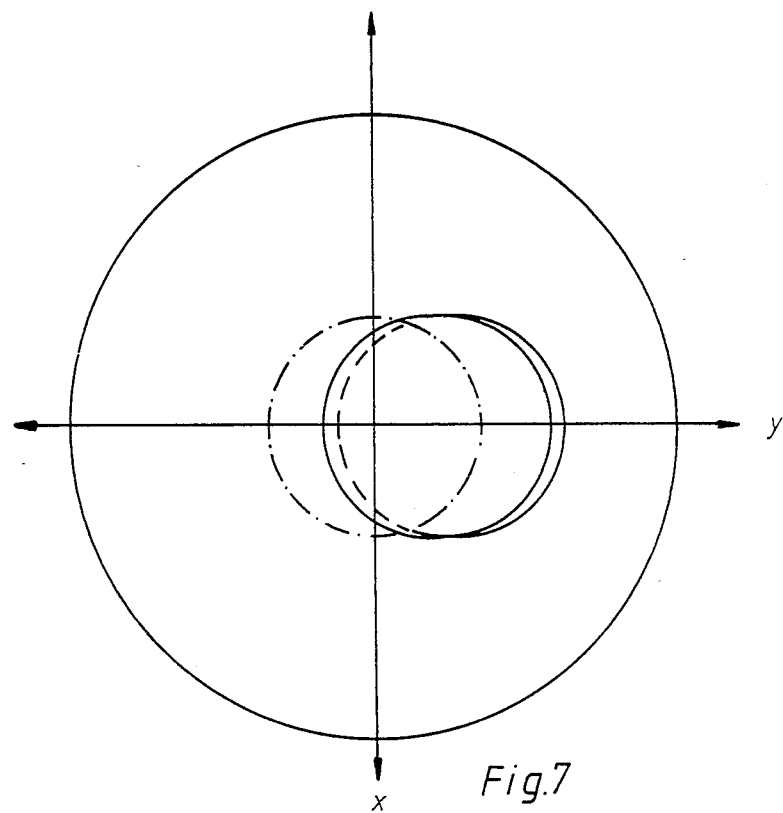
FIG. 7 is the associated front elevational view.
Figure 6:
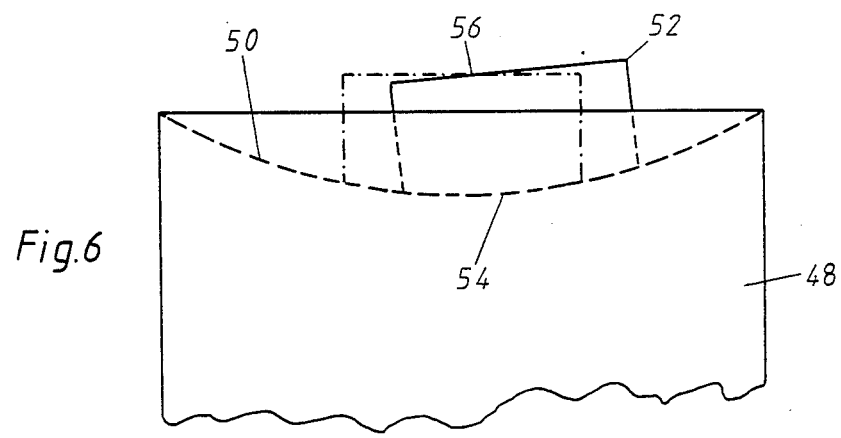
FIG. 6 is a side elevational view of another embodiment of the mounting of a resonator mirror on a mirror carrier.

In the embodiment of FIGS. 6 and 7, numeral 48 designates a base. The base 48 has a ground, concave-spherical surface 50. A mirror carrier 52 has a ground convex-spherical surface 54 engaging the ground concave-spherical surface 50 of the base 48. The mirror carrier 52 carries a resonator mirror (not shown) on a plane surface 56. By displacing the mirror carrier 52 on the surface 50 in horizontal or vertical direction the resonator mirror can be adjusted angularly in two planes.

Also here the mirror carrier is, at first, adjusted by means of a manipulator, the surfaces 50 and 54 sliding on each other with a thin air layer therebetween. When the mirror carrier 52 has been adjusted, it is attached to the base 48 by optical contact in the manner described.

Figure 8:
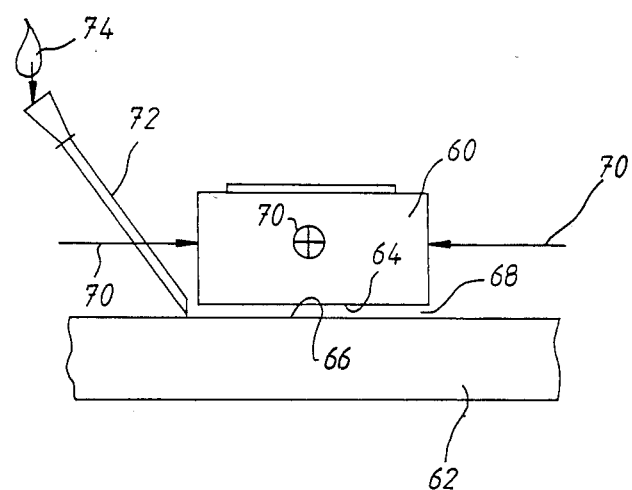
FIG. 8 illustrates the initiation of the procedure of attachment by optical contact.

A particularly advantageous way of attachment by optical contact is described hereinbelow with reference to FIG. 8.

Two parts to be interconnected by attachment by optical contact are designated by 60 and 62. Part 60 can be a mirror carrier, and part 62 can be a base. The two parts 60 and 62 have two surfaces 64 and 66, respectively, facing each other. In the present case the surfaces 64 and 66 are plane. These surfaces 64 and 66 are prepared in known manner for attachment by optical contact. At first, they are placed one on top of the other such that a very narrow gap 68 of a few nanometers is formed therebetween. This gap 68 permits displacement and adjustment of the parts 60 and 62 relative to each other by means of a manipulator, which is indicated by the arrows 70.

When the desired relative end position of the parts 60 and 62 has been achieved, several drops of an auxiliary liquid are applied to the edge of the gap 68 by means of a syringe 72. Distribution of the auxiliary liquid over all of the gap 68 is effected by capillary action of the gap. The process of attachment by optical contact is initiated by the introduction of this auxiliary liquid. It has been found that after some time (evaporation time) part 60 is firmly attached to part 62 by optical contact. No pressure needs to be exerted on part 60, whereby the adjustment might be disturbed again.

The auxiliary liquid is an easily wetting, quickly evaporating solvent. Acetone has proved very suitable in practice.

The surrounding limits of this connection can be guarded by lacquer, for example nitro-lacquer against air or liquids creeping into the gap again.

Instead of attachment by optical contact, also an appropriate adhesive between base and mirror carrier could be used to affix the mirror carrier. Care has, however, to be taken to ensure that the complementary contact surfaces of the mirror carrier and the base engage each other without any adhesive being interposed.

The adhesive is provided outside these contact surfaces between the base and the mirror carrier, whereby it acts as a kind of clamp to keep the contact surfaces in engagement. Thus the thermal dilation of the adhesive has no adverse effect.

We claim:

1. A method for mounting resonator mirrors in a laser, wherein
   (a) a mirror carrier carrying the resonator mirror and a base are provided with accurately mutually complementary ground surfaces,
   (b) the surfaces are polished to permit attachment by optical contact,
   (c) the mutually complementary surfaces of the mirror carrier and the base are brought into proximity to each other, whereby a narrow gap remains therebetween and
   (d) the mirror carrier is permanently attached to the base by attachment by optical contact,
   the method comprising
   (e) arranging said surfaces on the base and arranging said resonator mirror on the mirror carrier such that sliding movement of the surfaces relative to each other permits angular adjustment of the resonator mirror relative to the base,
   (f) after the base and the mirror carrier have been assembled, adjusting the mirror carrier with the resonator mirror relative to the base, and
   (g) in order to initiate the process of attachment by optical contact, placing an easily moistening, quickly evaporating auxiliary liquid on the edge of said gap between said polished, complementary surfaces, the auxiliary liquid being distributed by capillary action of the gap, the mirror carrier being attached to the base by optical contact after the auxiliary liquid has evaporated.

2. The method as claimed in claim 1, in which
   (a) the base is provided with a spherically-concave, ground surface as one of said complementary surfaces,
   (b) the mirror carrier, on one side thereof, is provided with a spherically-convex, ground surface which as the other one of said complementary surfaces engages said spherically-concave surface of the base.

3. A ring resonator with an arrangement permitting adjustment and then permanent attachment of resonator mirrors to a base, comprising
   (a) a base (10) having a first polished surface (12),
   (b) a plurality of mirror carriers (14, 16, 18), each having a second polished surface (20,22), said second surfaces (20,22) being in contact with said first surface (12) of said common base (10), said first surface (12) being complementary to said second surfaces (20,22),
   (c) said mirror carriers being attached to said base by optical contact,
   (d) each of the mirror carriers (14, 16, 18) having a third plane, polished surface which extends at an angle to the second polished surface (20,22), and
   (e) a resonator mirror (30,32,34) being attached to each of said third polished surfaces (24,26,28).

4. Ring resonator as claimed in claim 3 in which said first surface (12) and said second surfaces (20,22) are plane, and said third surface extends substantially at a right angle to the second surface (20,21).

5. Ring resonator as claimed in claim 3, in which
   (a) one of the resonator mirrors (34) is a concave mirror, and
   (b) the concave mirror (34) comprises a concave mirror body (36) having a plane, polished surface (38) and
   (c) the concave mirror body (36) contacts said third plane, polished surface (28) of the mirror carrier (18) and is attached thereto by optical contact.

6. A method of forming a ring resonator with an arrangement permitting adjacent and then permanent attachment of resonator mirrors to a base, comprising
   (a) providing a base with a first polished surface,
   (b) providing a plurality of mirror carriers each with a second polished surface, said second polished surfaces being complementary to said first polished surface,
   (c) providing each of said mirror carriers with a third polished surface, said third surface on each mirror carrier being provided at an angle to said second polished surface of each mirror carrier,
   (d) attaching a resonator mirror to each of said third ground surfaces, and
   (e) arranging said mirror carriers on said base with said second surface contacting said first surface, adjusting said mirror carriers on said base, and then permanently attaching said mirror carriers to said base by optical contact.

7. The method according to claim 6 in which in steps (a) and (b) said first and second surfaces are provided as plane surfaces, and in step (c) each said third surface is provided at a right angle to each said second surface.

* * * * *